Inventor:
Scipione Innocenti,
by Singer, Stern & Carlberg, Attys.

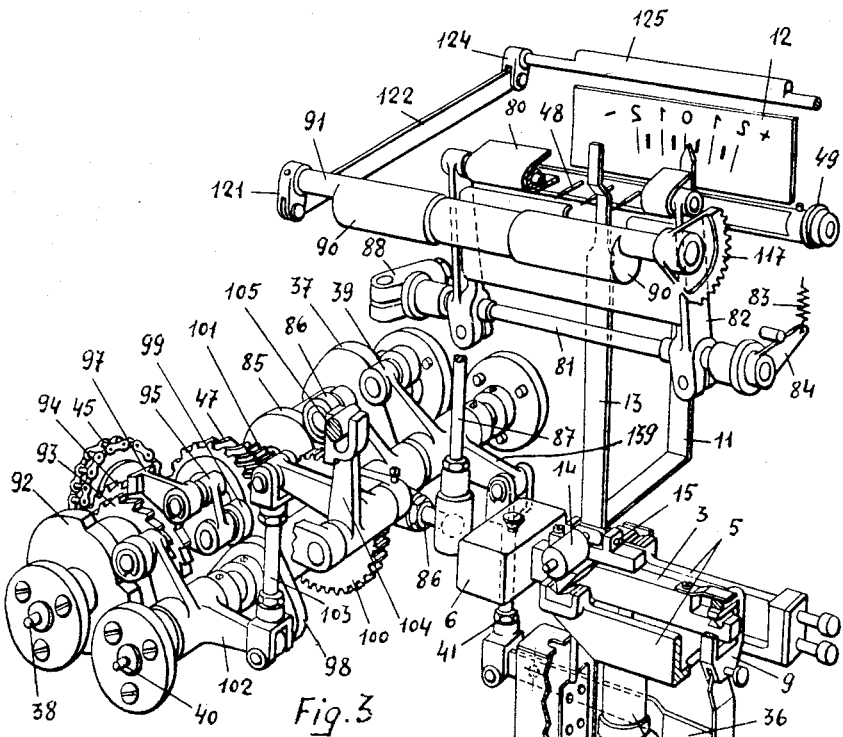
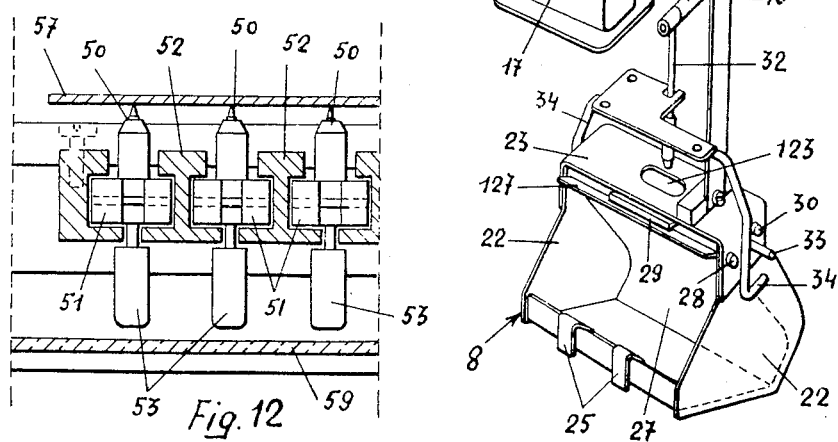

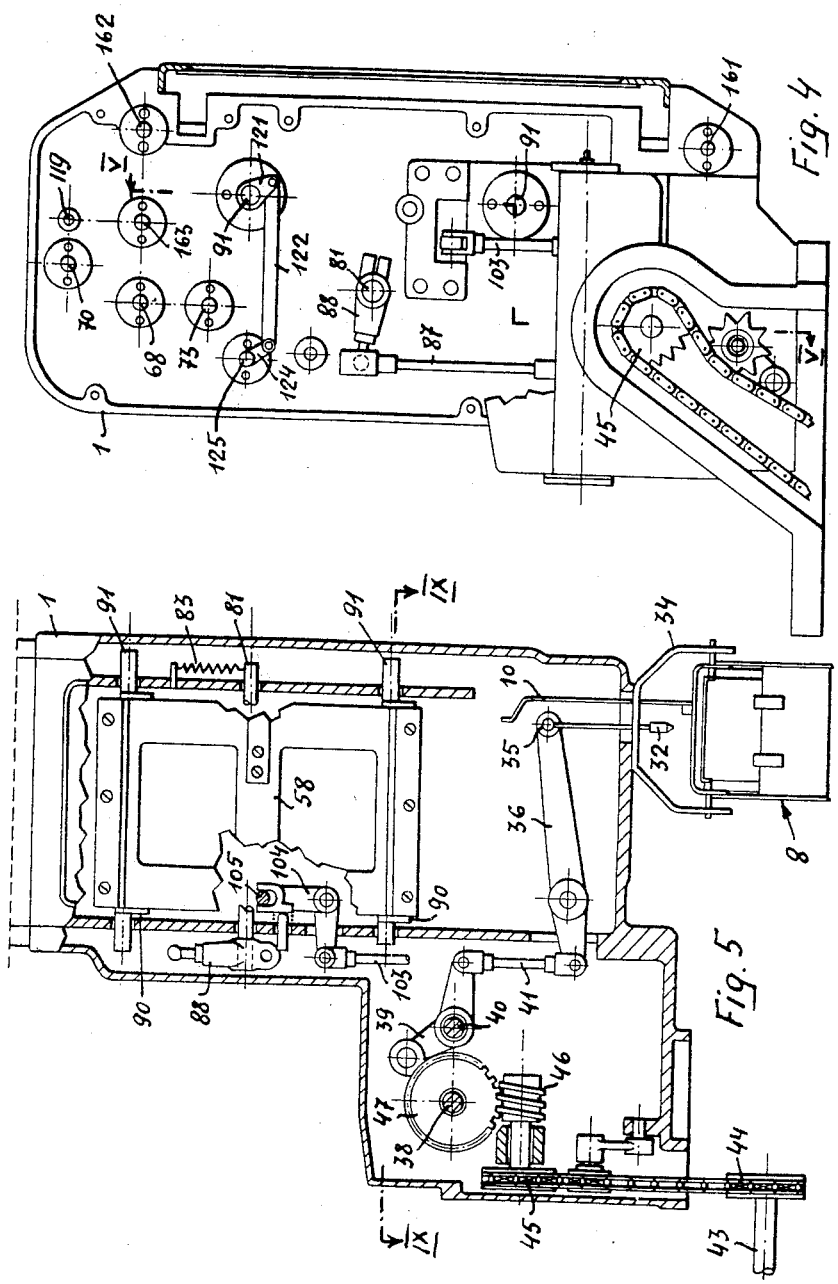

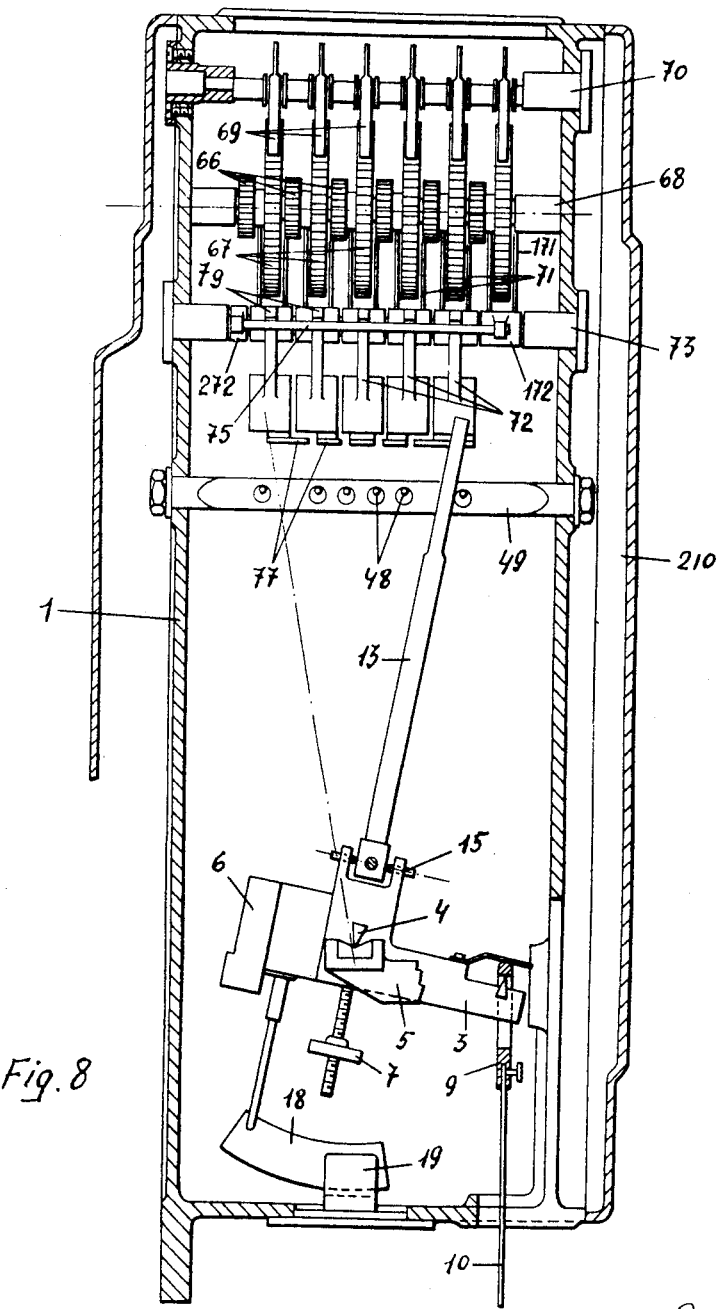

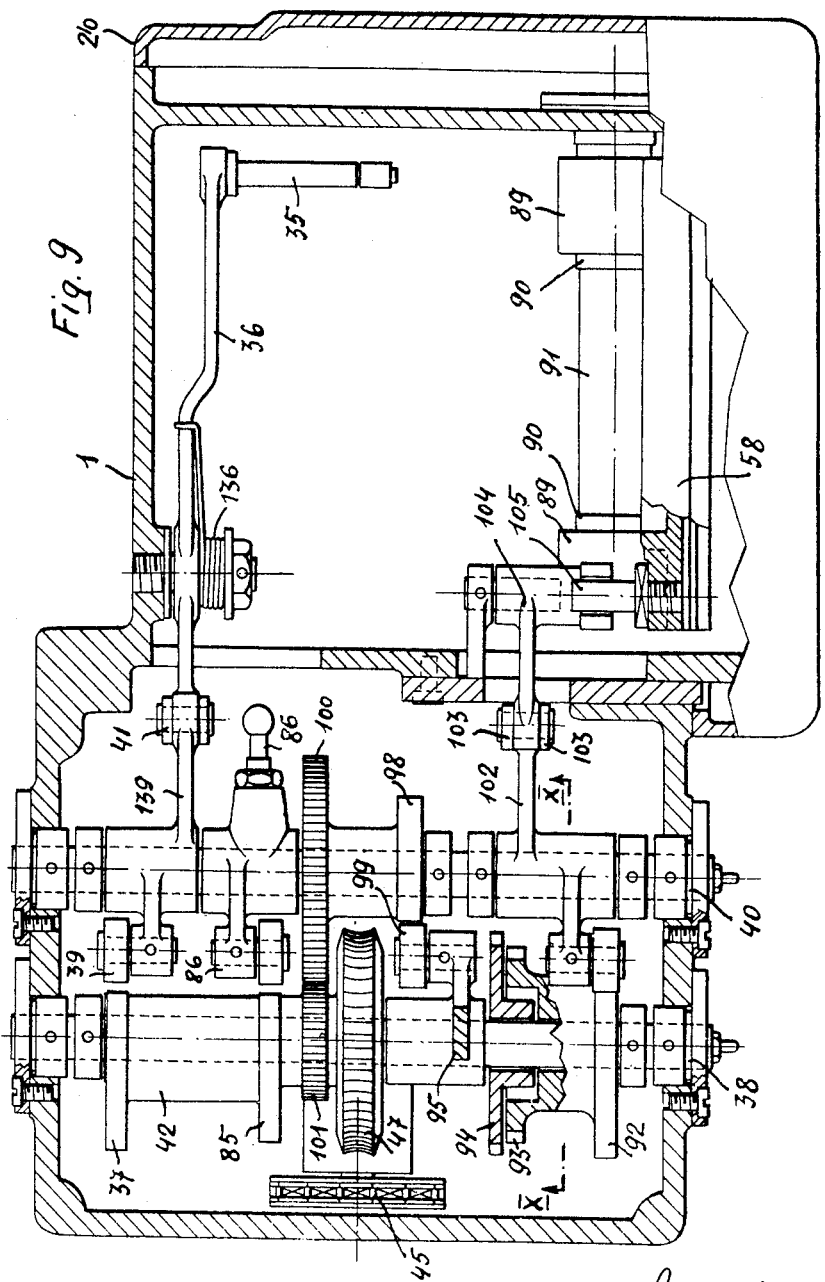

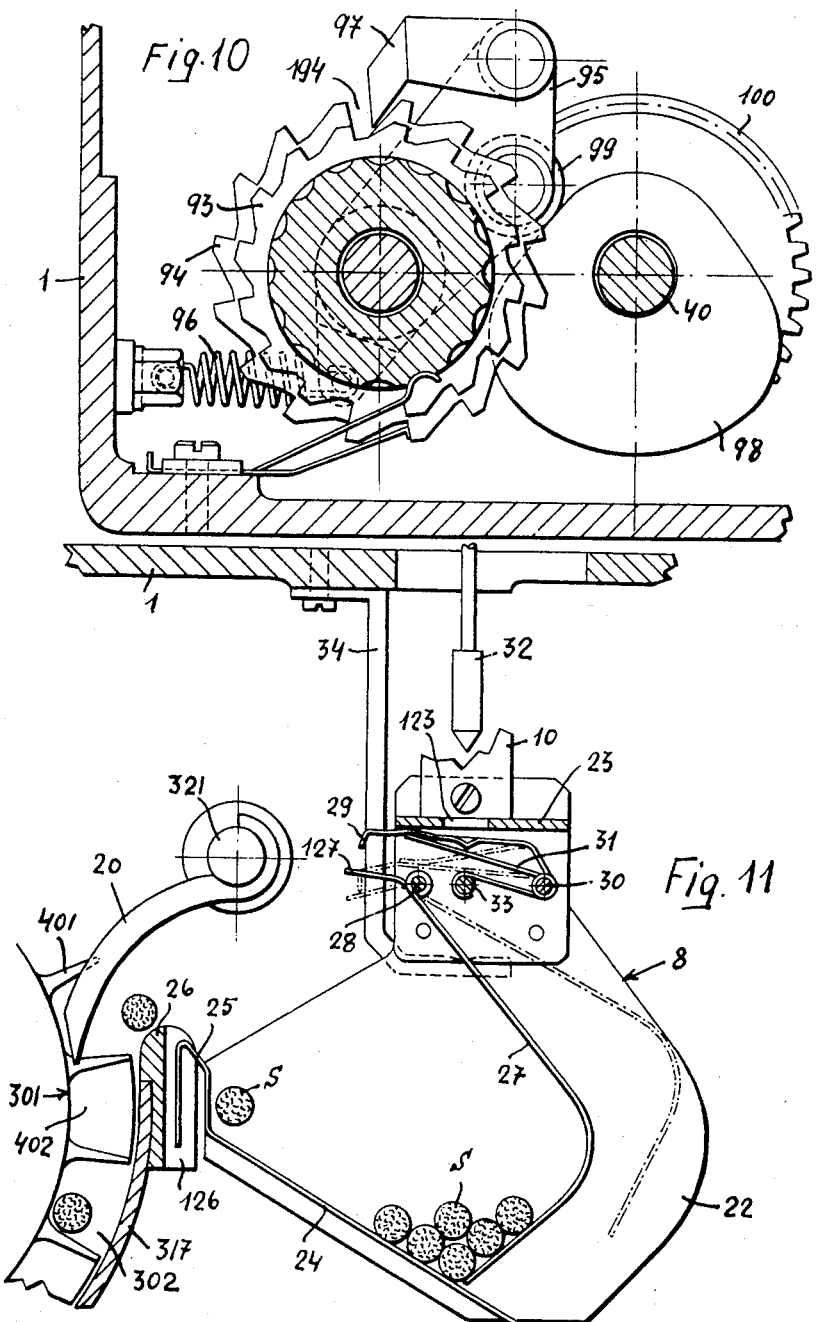

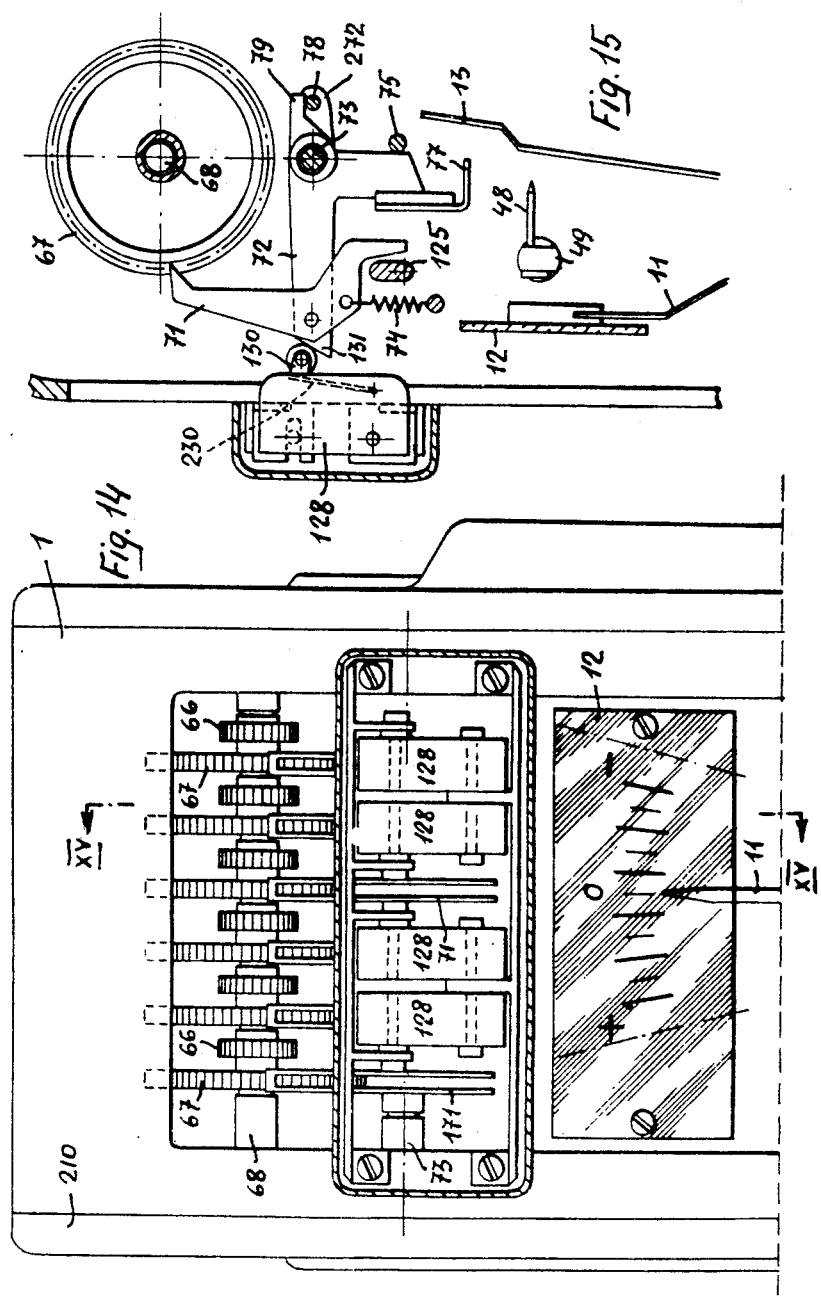

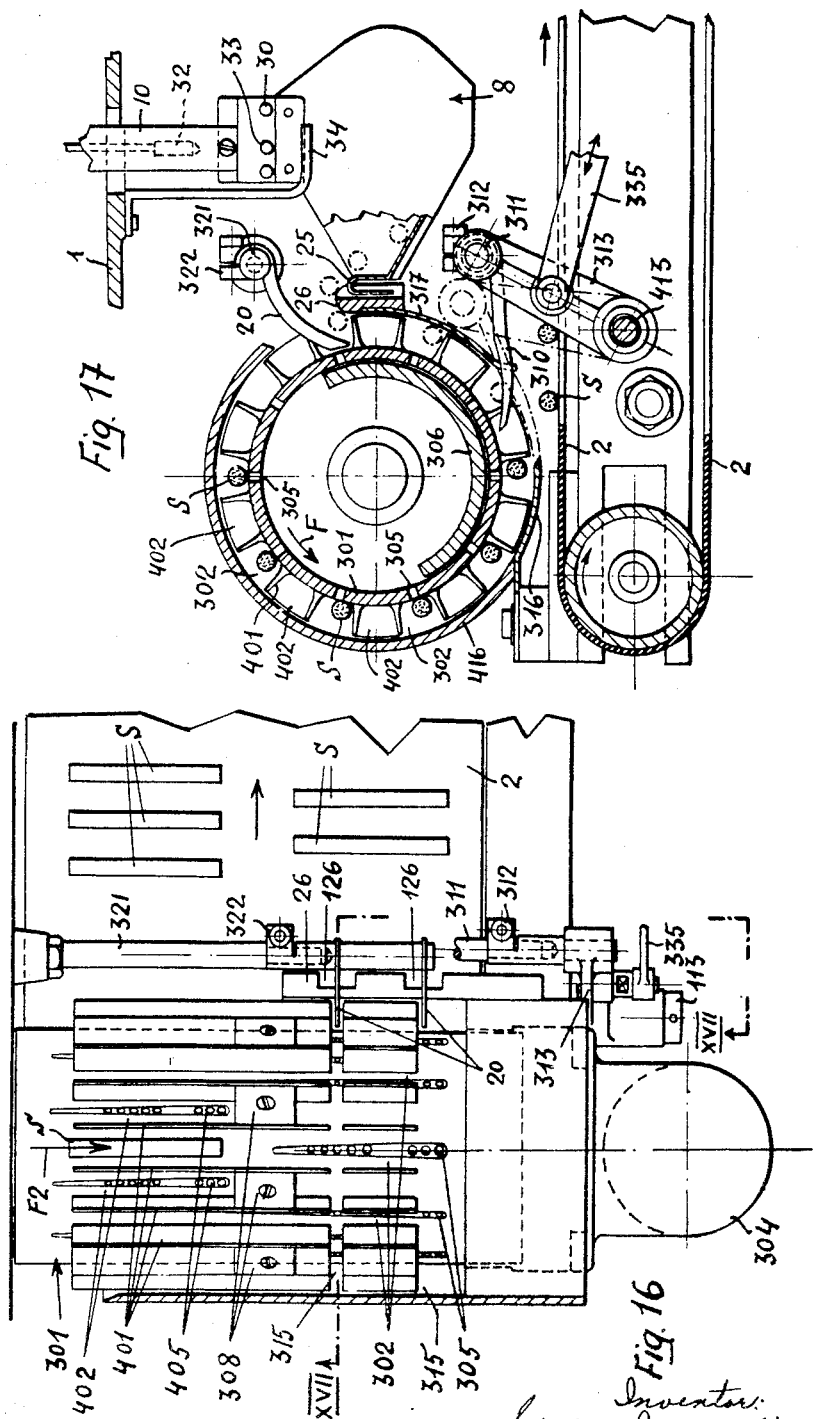

United States Patent Office 2,946,579
Patented July 26, 1960

2,946,579

APPARATUS FOR PICKING UP SAMPLES OF CIGARETTES, WEIGHING SAME AND RECORDING THEIR WEIGHT

Scipione Innocenti, Bologna, Italy, assignor to S.A.S.I.B.-S.p.A. Scipione Innocenti-Bologna, Bologna, Italy, an Italian joint-stock company Filed Mar. 6, 1956, Ser. No. 569,840

Claims priority, application Italy Mar. 11, 1955

24 Claims. (Cl. 265—5)

This invention relates to an apparatus for picking up samples of cigarettes, discharging the same into a scale pan, weighing the batches formed of a predetermined number of cigarette samples and recording the corresponding weights.

It is the main object of the invention to record the weights of the cigarette batches on a chart, subdivided in a predetermined number of weight sections which comprises the central section or range of standard weights, which includes all weights from a predetermined minimum to a predetermined maximum and including the truly exact weight, and a number of weight sections including weight sections under said standard weight section as well as weight sections above said standard weight section and to record the number of batches of cigarettes on a chart falling within each weight section by marking strokes on the chart to form parallel lines in which each line or stroke corresponds to a predetermined weight section the total length of which is indicative of the number of batches falling within that weight section.

Another object of the invention is to provide means for visually indicating the number of weighings which fall in each weight section at anytime, without stopping the machine or otherwise interfering with its normal operation.

Other objects are to provide means by which it is possible to act on the feed of the cigarette making machine, in order to adjust same so as to produce cigarettes falling within the standard weight section.

The apparatus according to the invention may be further provided with means for counting and recording the total number of weighing operations.

Other objects and advantages of the invention will appear from the following specification taken with reference to the attached drawings in which:

Figure 3 is a perspective view showing the casing removed to illustrate the weighing scale and the manner in which the pan is secured thereto and also showing the control pointer and its various operating parts.

Figure 4 is a vertical cross-sectional view taken on line 4—4 of Figure 1 and looking in the direction of the arrows.

Figure 5 is a vertical cross-sectional view taken on line 5—5 of Figure 4 on the irregular line showing the drive mechanism for dumping the weighing pan and illustrating the manner in which the chart support is reciprocated horizontally.

Figure 8 is a vertical cross-sectional view taken on line 8—8 of Figure 7 showing the manner in which the scale pointer is adapted to be oscillated into a position in registry with one of the ratchet operating levers to effect a step by step operation of a correspondingly positioned stylus pen.

Figure 9 is a horizontal cross-sectional view taken on line 9—9 of Figure 5 and looking in the direction of the arrows to illustrate the driving gearing for controlling the pan dumping mechanism and the chart reciprocating structure.

Figure 10 is a vertical cross-sectional view taken on line 10—10 of Figure 9 and looking in the direction of the arrows to illustrate the ratchet arrangement for advancing the control cams which actuate the chart arresting mechanism.

Figure 11 is an enlarged fragmentary sectional view taken vertically through the weighing pan and illustrating the manner in which the pan is dumped by the pivoted rear wall which is moved from its full line position to its dotted line position during a dumping operation.

Figure 12 is a horizontal cross-sectional view taken on line 12—12 of Fig. 7 and looking in the direction of the arrows to illustrate the manner in which the stylus pens are slidably guided in spaced apart relation one from the other.

Figure 13 is a front elevational view of the graph or chart employed having horizontal lines to indicate the number of weight operations and vertical lines to indicate weight deviation from a standard or zero graduation.

Figure 14 is a fragmentary rear elevational view taken on line 14—14 of Fig. 7 and looking in the direction of the arrows to illustrate the indicator arm and the arrangement of the various ratchet pawls which engage the ratchet wheels 67.

Figure 15 is a vertical cross-sectional view taken on line 15—15 of Figure 14 looking in the direction of the arrows and showing the manner in which a control switch may be actuated upon movement of the stylus operating step by step pawls during a weighing operation so as to control the tobacco feed to the cigarette making machine.

Figure 16 is a plan view of a device for extracting cigarettes from the production line and feeding them to the weighing pan of the weight scale, and Figure 17 is a vertical cross-sectional view taken on the irregular line 17—17 of Figure 16 and looking in the direction of the arrows.

Figure 7:
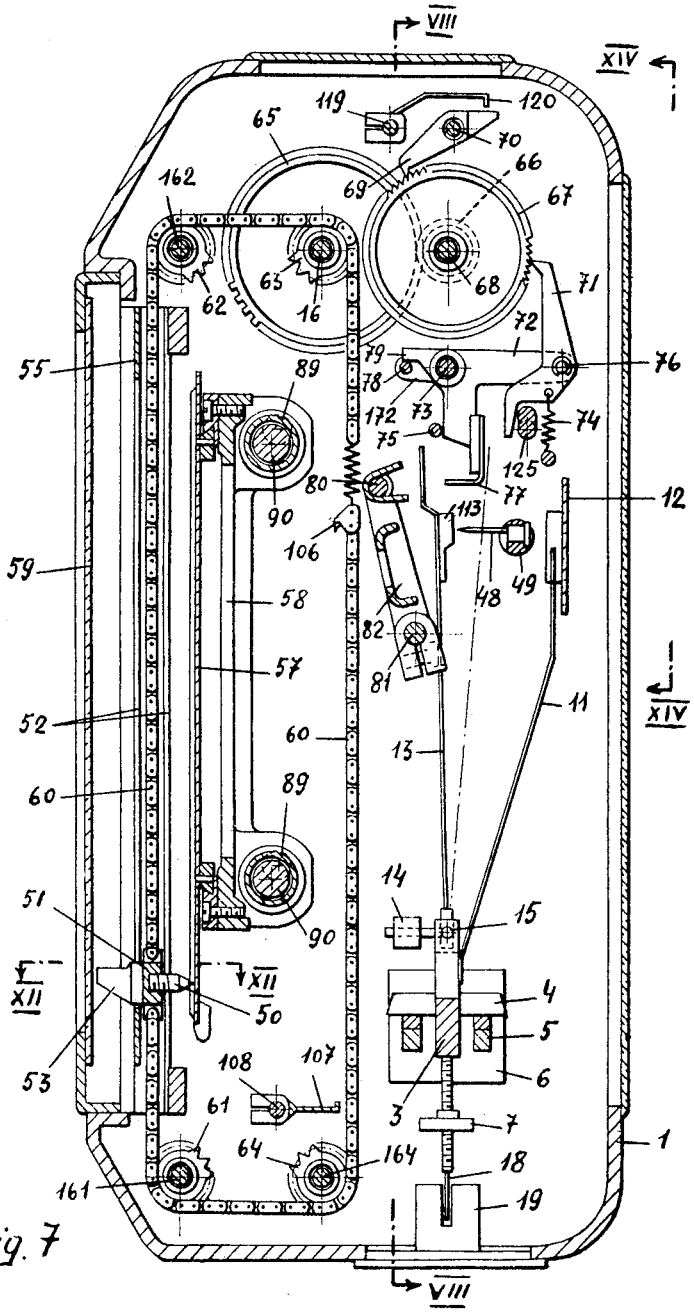
Figure 7 is a vertical cross-sectional view taken on line 7—7 of Figure 1 and looking in the direction of the arrows illustrating the manner in which the stylus pens are arranged to engage the chart and showing the sprocket chain gearing for moving said pens in a step by step fashion when the scale pointer is actuated.

With reference to the drawings, the weighing apparatus or weigher according to the invention is enclosed in a casing 1 arranged transversely on the collecting tape 2 on the delivery side of the cigarette-making machine. Said weigher comprises a beam 3 the supporting knife edges 4 of which bear on agate bearings of a supporting structure 5. On this beam 3 a skip-like pan 8 is suspended by means of stirrups 9 and of a suspension link 10 (Figures 3, 7 and 8). To the beam 3 an indicating hand 11 and a weight-recorders control pointer 13 are fastened. The hand is movable on a preferably transparent graduated scale 12 and the pointer 13, which shall be termed "selecting pointer" is fulcrumed on the beam 3 at 15, so as to oscillate also in a plane perpendicular to the plane of oscillation of beam 3, and is urged rearwardly by a weight 14. The beam 3 is provided with a counterweight proper 6 and an axially adjustable counterweight 7 which balances the weight of the hand 11 and pointer 13 and regulates the period of oscillation of the beam. The beam 3 is also provided with a conventional hunting damper which, in the embodiment as shown in Fig. 3 is of the hydraulic type and comprises a plate 16 provided with perforations and reciprocated in a liquid, for example oil, contained in a casing 17, while in the embodiment shown in Figures 7 and 8, the damper is of the magnetic type and comprises an aluminum blade 18 fastened to the beam 3 and oscillating between the poles of a permanent magnet 19.

Into the weigher pan 8 batches of cigarettes are delivered at intervals by an automatic cigarette-deflecting and charging device, for example of the type to be now described with reference to Figures 11, 16 and 17 of the drawings.

With particular reference to Figures 11, 16 and 17 this device comprises a conventional deflector drum 301 which moves the cigarettes out of the cigarette rod line or delivery tape of the cigarette-making machine, said tape being substantially level with the top part of said horizontal drum. Said cigarette delivery tape of the cigarette making machine is not shown on the drawings but it runs substantially parallel to and above the axis of said drum 301 so that the cigarettes, by arriving at the end of said delivery tape are fed onto the drum 301 in the direction of the arrow F2 in Figure 16.

In the embodiment as shown, which is particularly adapted for high-speed cigarette-making machines, the deflector drum 301 comprises a cylindrical shell provided with regularly spaced outwardly projecting fins 401 extending radially for the whole drum length and dividing the drum surfaces into a number of longitudinal channels or open-top cell pairs 302—402, the cells 302 being unobstructed for their whole length, while the cells 402 are usually obstructed transversely at about one cigarette length from their inlet ends by abutment members 308. The unobstructed cells 302 are provided at their bottom with a number of perforations 305 at their end that is on the opposite drum side to the cigarette inlet end, while the obstructed cells 402 are provided with like perforations 405 at their inlet ends, as clearly shown in Figure 16. Thus the perforations 305 and 405 are arranged in two parallel rows on opposite drum halves.

Inside of said drum 301 a cylindrical sector valve 306 is fitted tangentially to said hull, so as to obstruct the perforations 305, 405 of the cells which lie downwardly and at the right hand side in Figure 17 while outwardly and upwardly and at the left hand side of the same figure a cylindrical sector-shaped guard 416 is fitted. As a continuation of the lower end of the guard 416 a retaining plate 316 is arranged, which is adapted to prevent the cigarettes in the lower drum cells from falling down before reaching the vertical plane passing through the drum axis. Furthermore, at the right hand side another retaining plate 317 (Fig. 11) is fastened to a supporting bar 26, the free edges of said bar 26 and plate 317 being spaced from the upper edge of the guard 416 and from the lower edge of the retaining plate 316 as to preferably leave open the tops of a pair of cells 302, 402 both in proximity to the lower drum side, that is in cigarette discharging position, and above the upper edge of said plate 317, that is above the horizontal plane passing through the drum axis. In the lower gap, that is in the gap between plates 316 and 317 a baffle member 310 is shiftably mounted as will be better seen hereinafter and is adapted to close the lower gap of, at least on one drum side and to prevent the cigarettes contained in the lower uncovered pair of cells 302 or 402, according to which side the baffle is fitted, from falling down, as shown by the dash and dot line position in Figure 17, while in the other or full line position, this baffle member 310 leaves at least of the lowermost cells open, so that the cigarette contained therein may fall down on a collecting and conveying tape 2.

In order that the baffle member may assume this latter position, in the embodiment as shown in Figure 17 said baffle member 310 is formed as a fork whose prongs, as shown by full lines in Figure 17, may slide within transverse peripheral grooves 315 (Figure 16) formed by cutting away short sections of fins 401 in correspondence of the rows of perforations 305. Above the retaining member 26 of the guard sector 317, on the same drum side as baffle 310, abstracting curved cigarette engaging fingers 20 are mounted on a bar 21 so as to project into the grooves 315 (Figure 16) and, as shown by dash and dot lines in Figure 17, to throw any cigarette still contained in the drum cells 302 therefrom, above the top edge of the bar 26 and into the weighing pan, which is provided with hook-shaped strips 25 whose ends project into a slot 126 of said bar 26 without touching the bar when the pan is in its weighing position.

The interior of the drum 301 is connected through pipe 304 to a source of vacuum (not shown) so that the perforations 305 that are not covered by the valve sector 306 act as suction members which firmly retain the cigarettes S deposited thereinto by the said delivery tape of the cigarette-making machine. This takes place at the top cell, whereby in the cells 302 the cigarettes are stopped above the perforations 305 while in the channels 402, the cigarettes are stopped by the inlet end, on the perforations 405 (see Figure 16).

It may be mentioned, that if the cigarette-making machine is not a very high-speed machine, the drum may be provided with a single row of perforations 305 and may be therefore much shorter (about one-half) of the drum as shown, the cells 302 being all unobstructed.

The drum 301 is rotated in a counter-clockwise direction (arrow F in Figure 17) at such a speed, with respect to the speed of the said cigarette delivery tape of the cigarette-making machine, so as to present one empty channel 302 or 402 each time a cigarette is brought to the end of said delivery tape.

The baffle member 310 is adjustably mounted on a shaft 311 by means of an adjustable split sleeve 312. The shaft 311 is mounted on a rocking lever arm 313 mounted on a shaft 413 and rocked by a connecting rod 335. This shaft is normally kept in the angular position in which the baffle 310 is kept in the full line or cigarette-discharging position (Figure 17). In this position, in the embodiment as shown, the cigarettes fall from the lowermost open cell in two parallel rows (see Figure 16) on the underlying collecting tape 2. The shaft 413 is rapidly rocked at intervals so as to cause the baffle 310 to assume the dash and dot line position, and to permit the cigarette contained in the lowermost cell 302 at the right-hand side of the edge of plate 316 to remain within its cell and to be carried thereby up to the top edge of the bar 26 where said cigarette engages the fingers 20 and is pushed sidewise out of the drum cell into the weigher pan 8 arranged on the side of the drum provided with the row of perforations 405.

Figure 1:
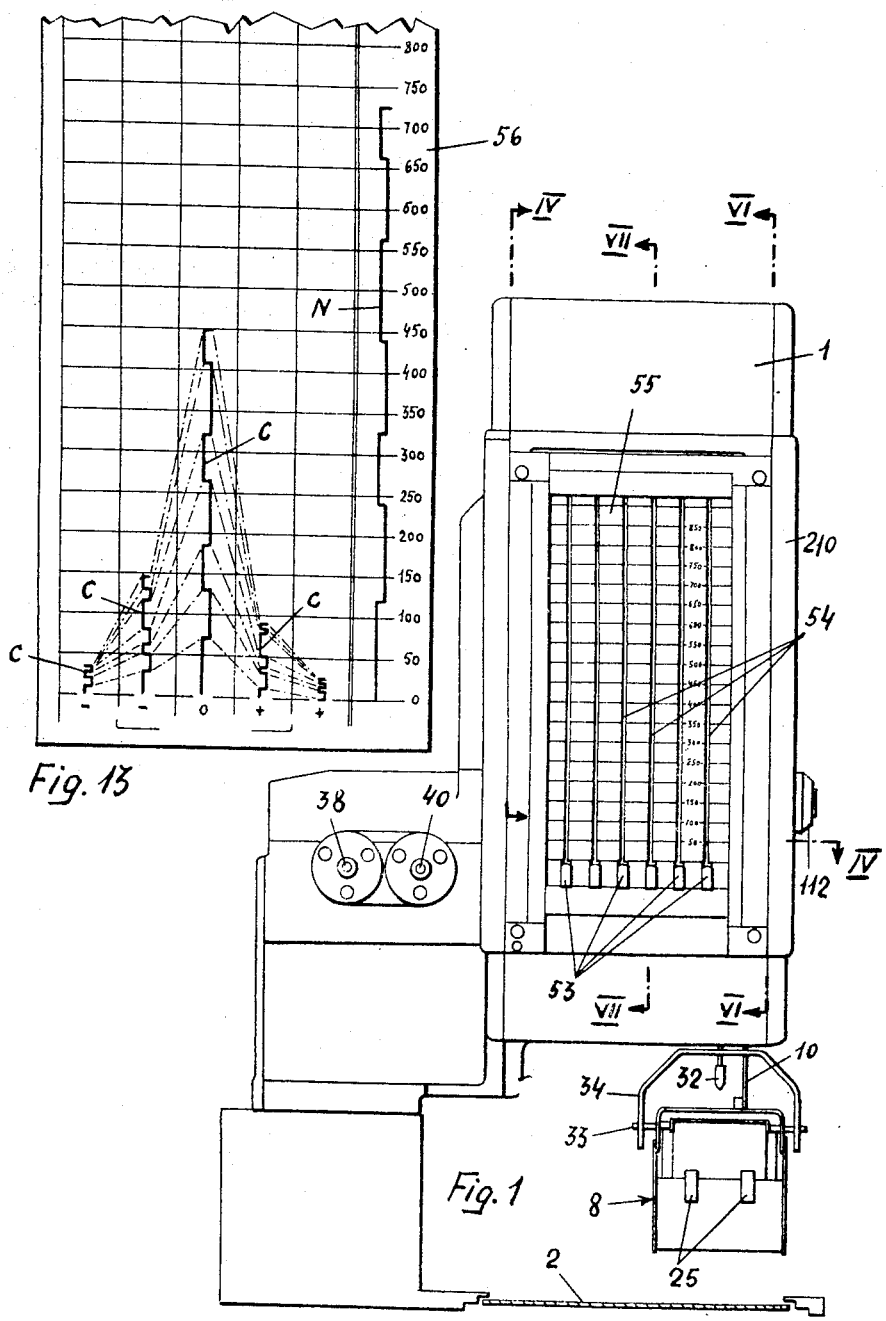
Figure 1 is an elevational view of the apparatus embodying the present invention showing the arrangement of the graph chart and illustrating the weighing pan disposed above an endless conveyor belt.

As stated, the cigarettes abstracted from the cells 302 by the abstracting fingers 20 fall into the collecting pan 8 which, as better shown in Figures 1, 3 and 11 is formed similar to a skip and comprises a pair of side plates 22 connected at their front end by an inclined bottom plate 24 provided with hooks 25 which project into recesses 126 of the fixed bar 26 over which the cigarettes are allowed to fall from the drum cells. The side plates 22 are connected at their tops by a yoke 23 suspended from the link 10 of the weigher. The rear and bottom end of the pan may be closed by a skip-shaped rear wall 27 fulcrumed on a transverse pivot 28 between said side plates 22. The rear wall 27 has formed at its top, beyond its fulcrum pivot 28 an extension 127 which is adapted to abut a lever 29 pivoted as at 30 to the stirrup 23. This lever 29 is pushed upwardly by a spring 31, anchored to a pin 33 projecting on both sides of the pan 8 and may bear in a stirrup-like member 34 fastened to the weigher casing 1. Said lever 29 may be depressed against the force of the spring 31 by a vertical push rod 32.

The vertical push-rod 32 is hinged to a pivot pin 35 at the end of a lever 36 which is biased in a pushrod-lifting direction by a spring 136, Fig. 9 and may be urged in an opposite direction by a cam 37 mounted on a shaft 38 and acting on the cam follower 39 fitted to a lever 139 idly mounted on a shaft 40 and connected to said lever 36 by means of a connecting rod pin 41 (Figures 3, 5, 9). The cam 37 is integral with a sleeve 42 which is mounted on the shaft 38 and is driven by a shaft 43 (Fig. 5) of the cigarette-making machine by means of a reduction gear comprising the chain drive 44, 45 which drives the worm 46 and which in its turn drives the worm wheel 47 integral with said cam-carrying sleeve 42.

The cam 37 is so shaped and adjusted as to effect the periodical succession of the pan-charging, weighing and discharging operations, in synchronism with the operation of the cigarette-abstracting and charging device shown in Figures 16 and 17. In fact, during the abstracting and charging of the batch of cigarettes, the push-rod 32 is depressed and, by acting on the lever 29 without shifting same, shifts the pan 8 downwardly until the ends of its pivot 33 engage the fixed stirrup 34, whereby the motion of the pan and the whole weighing device are stopped. After the charging of the cigarette batch, the push-rod 32 is lifted and thus it leaves the pan 8 completely free and the beam 3 is balanced in a weighing condition. Subsequently, the push-rod 32 is again depressed in a greater measure than before and therefore it first blocks the pan 8 on the stirrup 34 and then depresses the corresponding arm of lever 29 which, by abutting against the upper end 127 of the rear wall 27 of the pan, causes the same to swing rearwardly (as shown by dash-and-dot lines in Figure 11) so as to discharge the cigarette batch contained in the pan on the underlying collecting tape 2.

The weighing scale is adjusted so that the indicating hand 11 is in its zero position on the center of the dial 12 (Figures 3 and 4) when the weight of the batch corresponds exactly to the standard weight. At both sides of the zero there are graduations marking some plus or minus increments, from the standard weight and indicating to the operator the corrections to be effected on the feed of the cigarette-making machine.

As a precise standard weight is very difficult to maintain, the weights of the cigarettes of each batch are weighed and the weights recorded with a predetermined bilateral tolerance, the recordings being effected in stepwise increments or decrements of weights, thus ranging the various weights of the batches of cigarettes in one of a limited number of predetermined weight sections, which on the dial shown in Figure 14, are five in number and visually bounded by long and thick lines. The centre section extending to both sides of the zero setting corresponds to the standard weight section while the other four sections (two in defect and two in excess of the standard weight section) correspond to more or less permissible deviations from the standard weights.

The boundary between weight sections in the recording part of the weigher which, as will be seen, is controlled by the pointer 13, is constituted by a number of spaced pins 48 carried by a fixed bar 49 and projecting towards the pointer 13 out of its normal or non-recording position (Figures 3, 7 and 8).

The recording device of the weigher comprises a plurality of writing pens 50 (Figures 2, 7 and 12) carried by slides 51 mounted within parallel vertical guides 52 and provided with extensions 53 projecting outwardly through vertical slots 54 on the front wall 55 of the weigher casing 1. The wall 55 is formed as a graduated board and is usually covered by a transparent plate 59, while the pen 50 bears against a chart 56 (Figures 2, 13) fastened on a vertical supporting plate 57 which is mounted in its turn on a supporting frame 58 (Figures 2, 5, 7, 9) so as to be inserted and removed sidewise. Slides 51 are fastened to chains 60 each of which run on four chain sprockets 61, 62, 63, 64 idly mounted on shafts 161, 162, 163, 164. Each of the chain sprockets 63 is fastened to a gear 65 on the shaft 16 which meshes with a pinion 66 which is fastened to ratchet wheel 67, both the pinions 66 and 67 being idly mounted on the same shaft 68. Ratchet wheels 67 are engaged by independent pawls 69 which hold the ratchet wheels 67 against rotation in a clockwise direction looking at Figure 7 and are idly rockable on a shaft 70 to permit the rotation of their respective wheels 67 only in a counter-clockwise direction which corresponds to the vertical upward movement of the pens 50.

Figure 2:
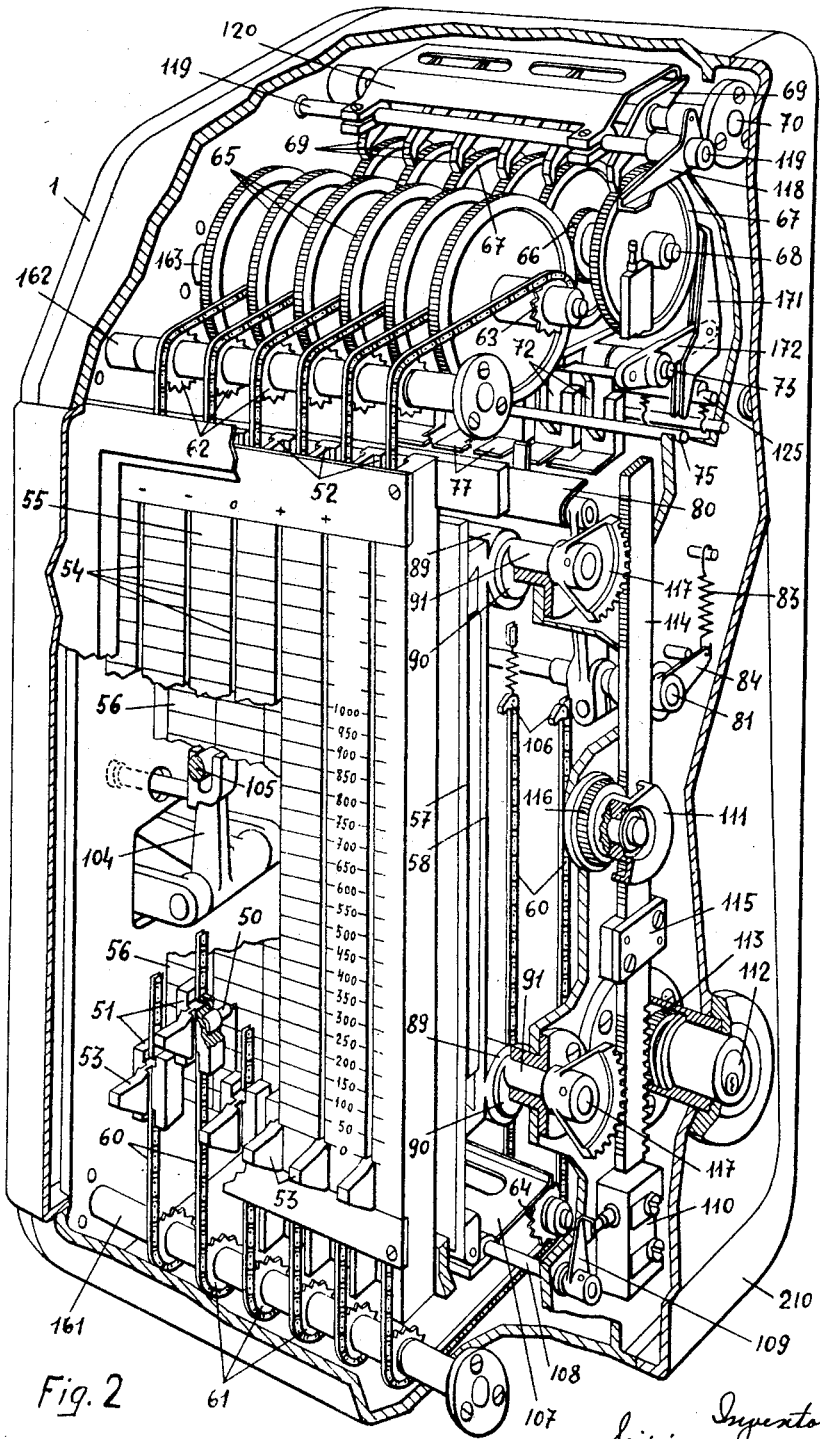
Figure 2 is a perspective view of the recording apparatus showing the casing broken away to illustrate the various operating parts.

The last pen 50 at the right hand of Figures 1 and 2 and which shall be called "weighings recorder" records the progressive number of the weighing operations which have been effected, while the other pens correspond each to one of the predetermined weight sections and enter into action each time a weighing operation falls within the limits of their respective weight section and thus will be called weight section-recorders or simply "section recorders."

The ratchet wheels 67 which correspond to the section recorders are engaged by a corresponding ratchet-driving pawl 71 (Figures 7 and 8) fulcrumed at 76 on a corresponding rocking lever 72 idly mounted on shaft 73 which, in turn, is idly supported. Each of said levers 72 is pulled by a spring 74 against a horizontal rod 75 and is provided with an angle plate or corner tail plate 77 and with an extension 79. The tail plates 77 are arranged above the row of pins 48, in front of the pointer 13, with their free ends on an ideal substantially horizontal line which is spaced from the pointer end and each of said ends extends in the space bounded by vertical planes drawn through two adjoining pins 48 corresponding to one of the weighing sections. Said tail plates or tails 77 co-act with the pointer 13, as will be more fully described hereinafter. The last (at the right-hand side in Figure 8) of the ratchet wheels 67 controls the recorder for the number of weighing cycles and is driven by a pawl 171 urged by a spring 74 and fulcrumed on a tailless lever 172 keyed on the same shaft 73 as levers 72 and connected with a like lever arm on the opposite end of the shaft 73 by means of a rod 78 on which bear the extensions 79 of all levers 72.

At the side of the control pointer 13, that is opposite to the rows of lever tails 77 looking in the direction of Figure 7, a bar 80 which extends for a distance equal to the entire swinging angle of the pointer 13 is mounted on arms 82 (Figures 2, 3, 7) which is keyed on a shaft 81. The bar 80 is provided with a pair of flanges arranged to straddle the tail plates 77. In rest position the bar 80 is maintained out of contact with the pointer 13 by a spring 83 acting on an arm 84 keyed to the shaft 81 (Figures 2, 3, 5, 6). Said bar 80 is rocked towards the pointer 13 as soon as a weighing operation is completed, and pushes said pointer 13 in the gap between two pins 48. The bar 80 is provided with spaced flanges and is adapted to engage the pointer 13 without touching the tails 77 of the levers 72. When said pointer engages the pointer 13 it is urged toward one of the tails 17 by the bar 80 and swung on its pivot 15 so as to engage the tail 77 which lies in a corresponding position between two pins.

The swinging of bar 80 at each weighing operation is effected by a cam 85 (Fig. 3) which is fastened to the sleeve 42 idly mounted on shaft 38 and acting on a follower lever 86 idly mounted on shaft 40 and connected through a ball joint-linked tie-rod 87 with an arm 88 keyed on the shaft 81 (Figures 3, 4, 5 and 9). When the pointer 13 is pushed by the bar 80 between two pins 48, it pushes the tail plate 77 and rocks the corresponding lever 72 which shifts its pawl 71 so as to advance the ratchet wheel 67 by one step. The wheel 67 in its turn drives through the sprocket drive 66, 65, 63 (Fig. 7) the corresponding chain 60 thus shifting the corresponding pen 50 upwardly. At the same time the extension 79 of the same lever 72 rocks the rod 73 and the lever 172 attached thereto and shifts the pawl 171 so as to drive the ratchet wheel 67 one step which transmits its movement to the chain of the weighings recorder pen, which is shifted upwardly by a length corresponding to one unit. When the bar 80 returns to its rest position, the pointer 13 is pulled by its counterweight 14 away from plate 77 and from between the pins 48, by swinging back on its fulcrum 15 and returns to the position shown by full lines in Figure 7, while the pens 50 are locked in their positions by the holding pawls 69 which lock their respective ratchet wheels 67 against rearward rotation.

Thus at each weighing operation, one of the section recorders draws on the chart a stroke which corresponds to one weighing of a cigarette batch corresponding to that weight section, and at the same time the weighing recorders draws a like line, whatever the operated section recorder may be. Thus after a certain time of operation, on the chart (Fig. 13) a number of vertical lines C will appear corresponding to the range of the different weight sections, whose length will correspond, in each section, to the number of batches whose weight was comprised within the weight range of the corresponding sections. Thus the length of the centrally located line C corresponding to the zero position on the chart is proportional to the number of batches of cigarettes whose weight was comprised within a standard weights range having as a middle element the exact standard weight, while the length of the lines C at the right hand side from the zero position of Figure 13 are proportional to the number of batches of cigarettes whose weight was above said standard weight, and the spacing from the zero position is in proportion to the amount of deviation from the exact weight.

In the same manner, the length of the lines on the left hand side of the chart from the zero position are proportional to the number of batches of cigarettes whose weight was under said standard weight.

On the chart will thus appear a graph line of the average weights of the cigarettes manufactured by the machine during a certain period of operation represented by the curved meeting at the top, or on the top of sections representing equal times of the different lines C in the manner as described below. The line N, whose length corresponds to the sum of all lines C, will record the total number of weighing operations which have been effected. Thus on the chart will appear the graph of the average weights of the cigarettes manufactured by the machine during a certain time of operation.

The position of the different pens 50 is visible from the exterior by observing on the graduated board 55 (Fig. 2) the positions of the pointers 53 carried by the same slides 51 which carry, on the opposite side, the corresponding pens 50.

The chart 56 is formed of graph paper and is provided with horizontal lines denoting the number of weighing operations and with vertical lines to indicate the different weight sections. The chart is supported by a frame 58 integral with pairs of bushings 89 which are slidable on two parallel horizontal shafts 91 having excentric parts 90 (Figures 2, 3, 5, 7 and 9). Periodically at preferably short, equal time intervals between two weighing operations, the frame 58 is shifted horizontally on its shafts 91 for short lengths (Fig. 7), alternatively in either direction. By these shifting movements, the writing pens each trace a short horizontal segment on the chart starting from the end of a vertical segment indicating the number of recorded weighings, and thus the lines indicating the numbers of sectional and total weighings, assume the shape of a fret line, as shown in Figure 13. By joining the angles of all fret lines C by broken lines or curves the angles of all fret lines C, which correspond to the simultaneous transverse strokes of the chart 56, in either direction, (as shown by dash-and-dot lines in Figure 13) a prospectus is obtained of the distribution of the average weights of the cigarettes produced by the machine at each time interval.

In the embodiment as shown, the transvres shifting of the frame 58 on the eccentric parts 90 of the shafts 91 is effected as follows: On the shaft 38 a cam 92 (Fig. 12) integral with a ratchet wheel 93 is idly mounted. At the side of said ratchet wheel 93 a larger ratchet wheel 94 is idly mounted, so as to rotate independently of the wheel 93. All of the spaces between all of the teeth pairs of the larger wheel 94, but one, which is indicated by 194 in Figure 10, are not so deep as to reach the level of the ridge of the teeth of the adjacent wheel 93. A reciprocating pawl 97 is hinged at the end of an arm 95 of a double armed lever provided with a cam follower 99 maintained in contact with a control cam 98 by a spring 96 anchored to the other arm of said lever 95 and to a fixed part of the machine. The pawl 97 is usually engaged between the teeth of the larger wheel, which it drives (in anticlockwise direction in Figure 10) each time the eccentric portion of the cam 98 engages the cam follower 99. When however the pawl 97 enters the deeper notch 194 of the larger wheel 94, upon reciprocation by the cam 98 it drives both wheels 93 and 94 of one step and when it is pulled back by the spring 96, it springs over the next teeth of the larger wheel 94 and engages the notch after the deep notch 194. The unit thus described constitutes a stepdown gear by which the small-diameter wheel 93 with attached cam 92 are driven by one step (usually equal to the angular distance between two adjoining teeth) each time the larger wheel 94 makes one complete revolution. Said pawl-controlling cam 98 is fastened to a gear 100 which meshes with a pinion 101 fastened on the sleeve 42 which carries the worm wheel 47, which, as said, is driven by the driving shaft 43 of the machine (Figures 4 and 5) through chain drive 44—45 and worm 46. On the cam 92 a follower roller bears which is rotatably mounted on one end of a bell crank lever 102 idly mounted on shaft 40 and connected by its other end to a connecting rod 103 (Figures 3, 4, 5, and 9) which is hinged by its other end to a bellcrank lever 104 which is thus rocked in a vertical plane. The other arm of said lever 104 has a forked end in which a crank pin 105 is engaged which is fastened to the chart supporting frame 58.

On the return run of each chain 60 a hook 106 is provided (Figures 2 and 7) which is adapted to engage a swinging lower frame 107 (Fig. 7) fastened on a shaft 108 and extending horizontally for the whole distance between the end chains 60. When one of the pens 50 reaches the upper limit of the chart 56, the hook 106 attached to its chain 60 reaches its lower limit of its downward movement and hooks the edge of frame 107 and rocks the same together with a lever arm 109 fastened on shaft 108 (Figure 6) and said arm 109 acts on a switch 110 which stops the machine.

Figure 6:
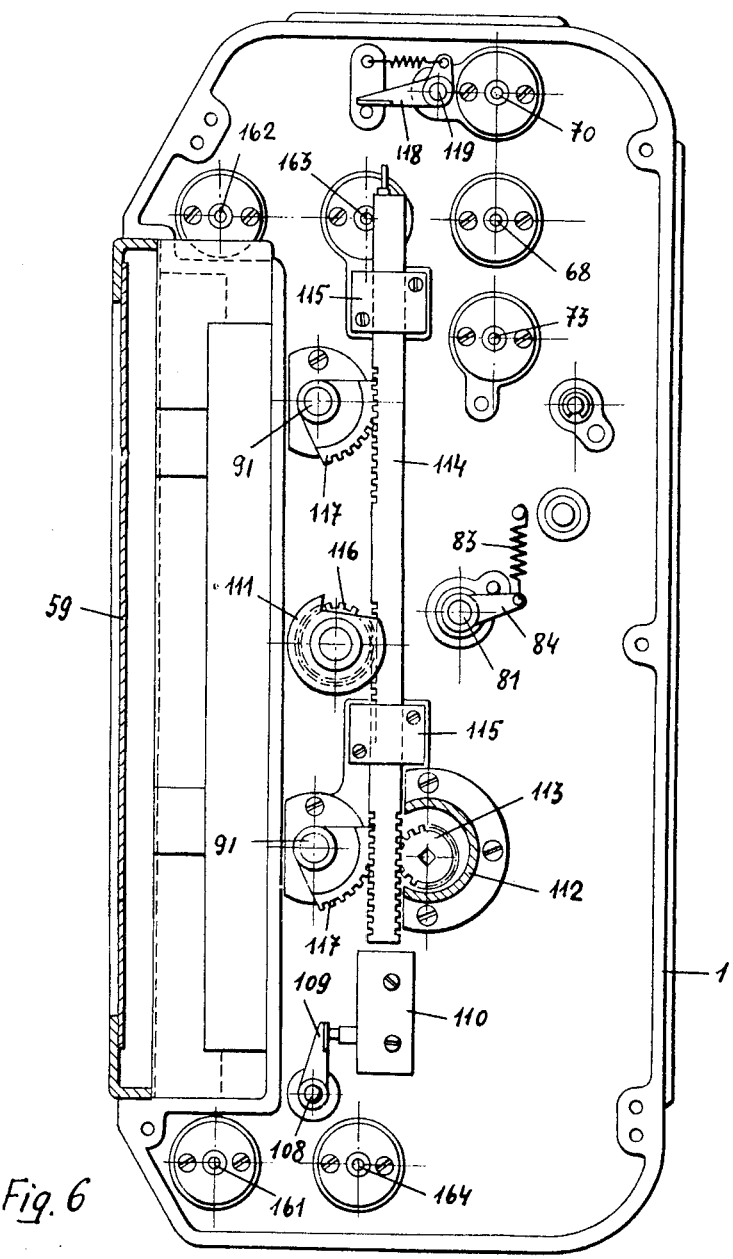
Figure 6 is a vertical cross-sectional view taken on line 6—6 of Figure 1 and looking in the direction of the arrows showing the manner in which the chart support is mounted in the casing and illustrating the release means for permitting the chart to be moved rearwardly out of engagement with the stylus pens.

The chart 56 may be taken out of the machine through a suitable door 210 of the weigher casing 1. Said door is normally locked by any suitable lock 112 which, in the embodiment as shown, drives a pinion 113 which meshes with a vertical rack 114 which is slidable in guides 115 (Figures 2 and 6). The rack 114 meshes with a pinion 116 which is integral with a rotatable bolt 111 of door 210 and with two toothed sectors 117 keyed on the shaft 91 on the eccentric portions 90 of which the chart-supporting frame 58 is mounted. By opening the lock 112, the rack 114 is shifted upwardly and promotes the rocking of the bolt 111 and thus the door 210 is unlocked. At the same time it angularly shifts the eccentric shafts 91 so as to cause the frame 58 to be shifted rearwardly and to move away from the writing pens 50. At the same time the upper rack end abuts against a lever arm 118 fastened on shaft 119 on which a rocking frame 120 is mounted and rocks this latter downwardly until it abuts against the pawls 69 and lifts the same out of engagement with their respective ratchet wheels 67 (Figures 2, 6, 7). On one of the shafts 91 (Figure 3) a lever arm 121 is fastened which is connected by means of a link 122 to a lever arm 124 fitted on a cam shaft 125 whose cam may engage at one time all of the driving pawls 71, 171. This shaft 91 is rocked by the rack 114 through the toothed sector 117 and thus rocks the cam shaft 125 whose eccentric part disengages the pawls 71, 171 from the respective ratchet wheels 67. In this condition the pens 50 are free to be shifted by hand downwardly, which is done by operating on the projecting pointers 53 fastened on the slides 51 inserted in the chains 60 and carrying the pens 50.

The just-described automatic weigher according to the invention may be employed advantageously for controlling any electric automatic cigarette weight-adjusting device, whose electric circuit may be controlled by micro switches 128 (Figures 14 and 15) each arranged in correspondence of each of the levers 72, and operated thereby. These switches may be also operated by the pawls 71 or even by the pointer 13.

In the embodiment as shown in Figure 15 each switch 128 is controlled by a lever 230 provided with an end roller 130 which bears on the inclined or suitably shaped tail end 131 of a lever 72.

From the foregoing it is apparent that the operation of the device may be summarized as follows:

*I. Picking up samples of cigarettes and delivering of same into the weighing pan (Figures 11, 16 and 17)*

The lower baffle member 310 is normally in the position as shown by full lines in Figure 17, that is, it projects into the grooves 315 between the fins 401 of the rotating drum 301. When the cigarettes S which are fed into the upper cells 302, 402 of the drum 301 come in correspondence of the lower gap between two retaining plates 316 and 317, they are deflected downwardly by said baffle 310 and fall through said lower gap on the underlying collecting tape 2, as they are no longer retained by suction in the drum cells 302, 402, due to the fact that the valve sector 306 closes the perforations 405 of said drum 301.

Periodically, at time intervals, the baffle 310 is withdrawn from the grooves 315 of the drum 301 and assumes the position shown by dash-and-dot lines in Figure 17. In this position the baffle 310 closes the lower gap between the two retaining plates 316 and 317 forming an extension of both said plates. Consequently, the cigarettes S, although they are no longer retained by suction in the drum cells 302, 402, no longer fall on the collecting tape 2, but are entrained by the fins 401 in co-operation with the retaining plate 316, along the baffle 310 and on the retaining plate 317, until they come in correspondence of the upper cigarette abstracting fingers 20, which project always in the grooves 315 of said drum 301. Said abstracting fingers 20 abstract the cigarette S from the drum cells 302, 402 and shift same outwardly above the bar 21 and allow same to fall into scale collecting pan 8.

After a certain time, during which a determined number of cigarettes S, instead of being deposited on the collecting tape 2 are delivered in the aforesaid manner into the weighing pan 8, the lower baffle member 310 returns in its position shown by full lines in Figure 17, in which it introduces itself into the drum grooves 315 and causes the cigarettes S to fall from the drum cells 302, 402 on the underlying collecting tape 2, as above described.

*II. Weighing of the batches of cigarette samples picked up and deposited in the weighing pan (Figures 1, 3, 5, 9 and 11)*

During the loading of the cigarettes into the scale pan 8, the cam 37 depresses the push-rod 32 which, by acting on the pan lever 29 pushes said pan downwardly until its lateral pivots 33 bear on the fixed stirrup 34. In this manner the pan 8 is stopped. After the batch of cigarette samples has been delivered into the pan 8 and after the baffle 310 (Figure 17) is returned to its position in which it allows the cigarettes S to fall out of the drum 301 on the collecting tape 2, the cam 37 lifts the push-rod 32 which leaves the pan 8 completely free for a certain time during which the scale beam 3 is stabilized in a weighing condition and during which the recording device of the scale is operated.

*III. Recording of the weight of the cigarette sample in the corresponding weighing section (Figures 2, 7, 8, 12 and 13)*

When the scale beam 3 stops in a position corresponding to the weight of the cigarette batch delivered in the scale pan 8, the pointer 13 comes to rest in front of one of the weight sections in which the weighing field, that is the scale dial 12, is subdivided. Then the cam 85 rocks the bar 80 by means of the transmission 86, 87, 88, 81, towards said pointer 13, that is in clockwise direction looking at Figure 7. The bar 80 abuts against said pointer 13 and swings same about its fulcrum 15 on the scale beam 3 in a clockwise direction (Figure 7). The pointer 13 abuts against the tail 77 of the rocking lever 72 which corresponds to the weight section in which the said pointer is stopped and thus causes the lever 72 to oscillate in a counter clockwise direction looking at Figure 7. The swinging movement of the lever 72 lifts the pawl 71 fulcrumed thereon and this shifts by a step the corresponding ratchet wheel 67 which in its turn shifts the corresponding chain 60 through drive 66, 65, 63 in such a manner as to lift by a step the weight section-recording pen 50 carried by slide 21 attached to said chain 60. Thus the said recording pen 50 traces a short vertical stroke on the chart 56 in the field of this latter which corresponds to the weight section of the cigarette batch being weighed. At each weighing operation only one of the weight section recording pens 50 is shifted upwardly by only one step.

In this manner the vertical strokes of the lines C of the diagram shown in Figure 13 are formed. Together with the weight section recording pen 50 also the corresponding indicating extension 53 is shifted upwardly on the graduated board 55 of of the housing. 1.

*IV. Recording of the progressive number of the weighing operations (Figures 1, 2, 6, 7, 8 and 13)*

When any one of the levers 72 provided in correspondence of the different weight sections is rocked by the pointer 13 by the action of the bar 80 in said manner, then the extension 79 of said lever 72 depresses the rod 78, thus causing the rocking of the lever 172. This lever carries the last pawl 171 shown at the right-hand side of Figure 1 and this pawl is thus lifted and shifts by one step the corresponding ratchet wheel 67 which in its turn through the drive 66, 65, 63 shifts by one step the corresponding chain 60 which carries the last pen 50 on the right-hand side of the Figures 1 and 2 (weighings recorder pen). This pen is thus shifted by one step upwardly and traces on the chart 56 a part of a vertical stroke of the line N of the diagram shown in Figure 13. The weighing recorder pen 50 is lifted at each weighing operation.

*V. Discharge of the cigarette batch from the scale pan after each weighing operation (Figures 2, 3, 5, 7 and 11)*

After the said recording operations which consist in shifting upwardly one of the weight section-recording pens and the weighing recorder pen, the cam 85 and spring 83 swing backwardly the bar 80 in counter-clockwise direction looking at Figure 7. The pointer 13 is thus left free and oscillates backwardly, in counter-clockwise direction about its fulcrum 15 on the scale beam 3 by the action of the counterweight 14 and thus disengages the tail 77 of lever 72 against which it had abutted previously. This lever 72 returns in its rest position, together with the pawl 71, by the action of spring 74. Thus the rod 78 may again come to rest in its upper position and consequently also the lever 172 and its pawl 171 may return to their rest position. The chains 60 and the actuated pens or markers 50 are blocked in their new positions by the holding pawls 69 which lock their respective ratchet wheels 67 against rearward rotation.

Subsequently the cam 37 pushes the push-rod 32 again downwardly farther than it had done during the delivery of the cigarette batch and thus first blocks the scale pan 8 on the fixed stirrup 34 in the described manner and then rocks the lever 29 downwardly. This latter abuts against the forward end 127 of the rearward wall 27 of the pan and rocks this wall 27 rearwardly about its fulcrum 28, as shown by dash-and-dot lines in Figure 11. The cigarettes S contained in the pan 8 then slip rearwardly on the inclined bottom 24 of said pan and fall on the collecting tape 2.

When the pan 8 is emptied, the cam 37 lifts the push-rod 32 and thus the lever 29 is set free and the lower pan wall 27 oscillates rearwardly into closing position.

*VI. Horizontal shifting of the recording chart (Figures 2, 3, 4, 5, 7, 10 and 13)*

At regular time intervals between two weighing operations, when all the recording pens are stopped, the chart 56 is shifted horizontally for short strokes once towards the right and another time towards the left hand side, thus forming the horizontal strokes of the lines C and N of the diagram shown in Figure 13. For this purpose the chart-supporting frame 58 is shifted axially on the eccentric parts 90 of its horizontal shaft 91 by means of the bell crank lever 104 which engages by means of one of its ends a pivot pin 105 fastened to the frame 58. This bell crank lever 104 is rocked at time intervals, once towards the left, another time towards the right hand side by means of the cam 92 through the bell-crank lever 102 and the connecting rod 103. The cam 92 is controlled by the step-down gear described with reference to Figure 10.

*VII. Stopping of the device when one of the pens reaches the upper end of the recording chart (Figures 2, 6 and 7)*

When one of the pens 50, usually the weighing recorder pen, reaches the upper end of the chart 56, the hook 106 fitted on the return run of its respective chain 60 engages the rocking frame 107 and rocks the same in a clockwise direction (Figure 7). The lever 109 (Figures 2 and 6) fastened on shaft 108 of said frame 107, acts then on the switch 110 and stops the device.

*VIII. Taking out of the recording chart (Figures 2, 6 and 7)*

The chart 56 may be taken out of the machine through the door 210 of the casing 1 by acting on the lock 112 which shifts the rack 114 upwardly by means of pinion 113. Rack 114 rotates the pinion 116 which rocks the bolt 111 so as to unlock the door 210. Furthermore the rack 114 rocks the two toothed sectors 117 integral with the eccentric shafts 91 on which the recording chart frame 58 is mounted. The shafts 91 are thus rotated by a fraction of one complete revolution, so as to shift the recording chart 56 apart from the pens 50. The upper shaft 91, through levers 121, 122, 124 (Figures 3 and 7) rotates the cam shaft 125 which rock the pawls 71, 171 in clockwise direction looking at Figure 7, so as to disengage said pawls from their respective ratchet wheels 67. At the same time the upper end of rack 114 abuts against lever 118 and causes the frame 120 to oscillate in a clockwise direction looking at Figure 7. This frame 120 abuts against the holding pawls 69 and lifts the same from their respective ratchet wheels 67. In this condition the pens are free to be shifted by hand downwardly, which is done by operating on the pointers 53.

I claim:

1. An apparatus of the kind described, comprising a rotating drum mounted to rotate on a horizontal axis adjacent the rod line of a cigarette making machine having longitudinal cells in the form of open channels in its periphery with a series of openings in the periphery of the drum forming perforated bottom walls for said channels, said channels when in their top position being adapted to receive a cigarette from the rod line of said cigarette-making machine, suction means connected to said drum interior for effecting a suction through the perforations of said drum to hold cigarettes in certain of said channels, fixed valve means within said drum at the lower portion thereof for closing a part of the perforation corresponding to the lower and adjacent cells, up to a predetermined angular position before the channels in said drum reach the limit of their arcuate travel at the top of the drum, lever means presented to said drum for abstracting samples of cigarettes from said drum, and for ejecting same in a position out of the drum cells; a weigher scale having a pan for receiving batches of said cigarette samples from said rotating drum removed by said lever means, a pivotally balanced counterweighted beam on said scale from which said pan is suspended for weighing said cigarettes, a control pointer attached to said beam by means of a hinge at right angles to the pivotal means of said beam whereby said pointer is permitted to be rocked in a direction at right angles to the oscillation of said weigher scale beam; weight means for urging said control pointer in an inoperative position, spaced from all adjacent parts, so as to permit its free oscillation; actuating bar means for engaging and rocking said pointer in said last named direction when the said beam is stopped after a weighing operation, lever means operated by said pointer during its rocking movement for indicating and recording the approximate or sectional angular position in which the said control pointer has been oscillated, means for releasing said control pointer-rocking means and permitting the same to return to said inoperative position, and means engageable with said weigh pan periodically after each weighing cycle to hold said pan against movement.

2. An apparatus of the kind described, comprising a weigher scale, a cigarette receiving pan attached to a pivotally supported counterweighted beam on said scale, a selector drum means for taking samples of cigarettes from the production of a cigarette-making machine and feeding same into said pan, releasable pan holding means for holding said pan in a predetermined position during the feeding of cigarettes thereto and releasable when the approximate number of the cigarettes have been fed into the pan and as soon as the weight of said cigarettes averages a predetermined weight corresponding to the weight of a predetermined number of cigarettes, an indicating hand and a control pointer attached to said beam and oscillating therewith, said pointer being hingedly connected to said beam at right angles to the pivotal means of said beam so that said pointer is permitted to be rocked in a direction at right angels to the oscillation of said weigher beam; counterbalance weight means for normally urging said control pointer in an inoperative position and spaced from all adjacent parts, so as to permit its free oscillation; movable bar means for rocking said pointer on its pivot in one direction when the said beam is stopped after a weighing operation, a series of lever means adapted to be individually operated by said pointer, when it is rocked, for indicating and recording the approximate or sectional angular position in which the said control pointer has been oscillated, and means engageable with said weight pan after each weighing cycle to hold said pan against vibratory movement.

3. An apparatus according to claim 2 in which the means for taking the cigarette samples and for charging same into the weigher pan comprises a deflector drum which receives the cigarettes out of the cigarette rod line of the cigarette-making machine and holds same by pneumatic action until it rotates to a position in which said cigarettes are allowed to fall on a conveyor tape, a movable deflector being provided for periodically holding one of the cigarettes on the drum beyond its normal discharging position, abstracting means provided beyond said normal discharging position, which abstract the cigarettes still left on the drum and discharge same into the said weigher pan.

4. An apparatus according to claim 2 in which the means for taking the cigarette samples and for charging same into the weigher pan comprises a deflector drum which receives the cigarettes out of the cigarette rod line of the cigarette-making machine and holds same by pneumatic action until it rotates to a position in which said cigarettes are allowed to fall by gravity on a conveyor tape, a movable deflector being provided for periodically holding one of the cigarettes on the drum beyond its normal discharging position, abstracting means provided beyond said normal discharging position, which abstract the cigarettes still left on the drum and discharge same into the said weigher pan; wherein the said deflector is in the form of a forked lever adapted to be received in circumferential grooves formed on the drum transversally of the cigarette-holding cells for receiving said deflector.

5. An apparatus according to claim 2 in which the means for taking the cigarette samples and for charging same into the weigher pan comprises a deflector drum which receives the cigarettes out of the cigarette rod line of the cigarette-making machine and holds same by pneumatic action until it rotates to a position in which said cigarettes are allowed to fall on a conveyor tape, a movable deflector being provided for periodically holding one of the cigarettes on the drum beyond its normal discharging position, abstracting means provided beyond said normal discharging position, which abstract the cigarettes still left on the drum and discharge same into the said weigher pan; whereby the said deflector is in the form of a forked lever; said drum being provided with circumferentially extending grooves transversally of the cigarette-holding cells and means for rocking said forked lever into and out of the path of the cigarettes retained by the drum; and in which the said cigarette-abstracting device is in the form of curved fingers inserted in said circumferential transversely extending drum grooves and sweeping the surface of the drum in a position beyond said deflector, so as to drive out and throw into the said weigher pan any cigarettes still left on the drum.

6. An apparatus according to claim 2 in which the indicating and recording means comprises a recording chart-carrying frame, a number of writing pens presented to said chart arranged to record different weight ranges, means for stepwise shifting said pens in parallel relation with their points in contact with said recording chart and each of which is actuated to draw a vertical stroke in response to a weighing cycle which indicates a weight falling within the range corresponding to it.

7. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle, wherein the chart is supported by a frame slidably mounted for movement in a direction transverse to the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, whereby at each rocking movement of the lever the chart supporting frame will be correspondingly shifted in a transverse direction.

8. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle, wherein the chart is supported by a frame slidably mounted for movement in a direction transversely to the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, wherein upon each rocking movement of the lever the chart supporting frame will be shifted transversely of the direction of pen movement, and means adjacent said control pointer for driving which the carrier means of that pen which corresponds to the weight section indicated by said pointer.

9. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle, wherein the chart is supported by a frame slidably mounted for movement in a direction transverse to the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, wherein upon each rocking movement of the lever the chart supporting frame will be correspondingly shifted and in which the stepwise shifting of the weight section recorder pens is effected by a mechanism comprising an independent control lever for each weight section recorder pan, said levers being idly fulcrumed substantially parallel to and in front of the sector along which the said control pointer is shifted by the said scale beam, a transverse bar extending transversely of said oscillation sector of the said pointer, on the side opposite to said levers, and rockable towards or away from said pointer, so as to oscillate the pointer against one of said levers which said pointer has been moved in response to a weighing cycle, and rock said one lever by a predetermined angle, or to retract same therefrom after the said pointer has abutted against said one lever, means connected to said lever for transforming the rocking movement thereof effected by the abutting of said control pointer into a limited linear stroke of the corresponding weight section recorder pen in one direction, said chart extending in the direction of movement of all pens, so that the pens bearing thereon trace a stroke each time they are driven by the corresponding lever, spring means for urging said levers to a position of rest when they are not acted upon by said pointer and means for retracting said control pointer from said levers each time the said transverse bar is retracted from said control pointer.

10. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle, wherein the chart is supported by a frame slidably mounted transversely of the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, wherein upon each rocking movement of the lever, the chart supporting frame will be shifted correspondingly; and in which the stepwise shifting of the weight section recorder pens is effected by a mechanism comprising an independent control lever for each weight section recorder pan, said levers being idly fulcrumed substantially parallel to and adjacent the sector along which the said control pointer is shifted by the said scale beam, a transverse bar extending transversely of said oscillation sector of the said pointer, in opposed relation to said levers, and rockable towards or away from said pointer, so as to shift said pointer against one of said levers corresponding in position to the angular position of said pointer and rock said lever through a predetermined angle, or to retract said pointer therefrom after the said pointer has abutted against said lever, means connected to said lever for transforming the rocking movement thereof effected by the abutting of said control pointer into a limited linear stroke of the corresponding weight section recorder pen in one direction, said chart extending in the direction of movement of all pens, so that the pens bearing thereon trace a stroke each time they are driven by the corresponding lever, spring means being provided for urging said levers to a position of rest when they are not acted upon by said pointer and means for retracting said control pointer from said levers each time the said tranverse bar is retracted from said control pointer, and in which each pen is slidably mounted between parallel guides and is connected to a flexible transmission chain tensioned between at least two sprockets one of which is operatively connected with a stepwise driving means comprising a ratchet wheel and a driving pawl whereby the driving pawls are each operatively connected with one of said rocking levers.

11. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle wherein the chart is supported by a frame slidably mounted transversely to the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, wherein upon each rocking movement of the lever the chart supporting frame will be shifted correspondingly; and in which the stepwise shifting of the weight range marking pens is effected by a mechanism comprising an independent control lever for each weight range marking pan, said levers being idly fulcrumed substantially parallel to the sector along which the said control pointer is shifted by the said scale beam, a transverse bar extending transversely along the said oscillation sector of the said pointer, on the side opposite to said levers, and rockable towards or away from said pointer, so as to oscillate said pointer against one of said levers and rock said one lever through a predetermined angular distance and to retract same therefrom after the said pointer has abutted against said one lever, means connected to said lever for transforming the rocking movement thereof effected by the abutting of said control pointer into a limited linear stroke of the corresponding weight section recorder pen in one direction, said chart extending in the direction of movement of all pens, so that the pens bearing thereon trace a stroke each time they are driven by the corresponding lever, spring means being provided for urging said levers to a position of rest when they are not acted upon by said pointer and means for retracting said control pointer from said levers each time the said transverse bar is retracted from said control pointer, and in which each pen is carried by a block carrying at its opposite side indicating means projecting out of a graduated board and visually indicating the position of the pens, said indicating means being adapted to be shifted manually to their starting position when the chart has to be removed from its frame, each of said pen and projecting indicating means-carrying block being mounted between parallel guides and connected to a flexible transmission chain tensioned between at least two sprockets and stepwise driving means for each of said sprockets comprising a ratchet wheel, a driving pawl and means for operatively connecting a preselected one of said rocking levers which corresponds to said driving pawl each time the said control pointer is moved into a position corresponding to the weight range and is driven against said rocking lever.

12. For use as driving means of the chart-supporting frame-shifting lever according to claim 7, a step-down gear comprising two independently rotatable adjoining ratchet wheels, one of which is larger than the other and whose notches between the teeth are of such a depth as not to extend beyond the ridges of the teeth of the adjoining ratchet wheel, with the exception of one notch, which is deeper, a driving pawl mounted so as to normally engage the teeth of the larger wheel only, but to engage the corresponding teeth of both wheels when it corresponds in position to the deeper notch of the larger wheel, and a cam, rotated at suitable speed, engaging a follower connected to said pawl, so as to reciprocate said pawl and to stepwise drive said wheels, according to which set of notches said pawl is in engagement with.

13. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle wherein the chart is supported by a frame slidably mounted transversely of the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, wherein at each rocking movement of the lever the chart supporting frame will be shifted correspondingly; and in which the stepwise shifting of the weight range indicator pens is effected by a mechanism comprising an independent control lever for each weight range indicating pan, said levers being idly fulcrumed substantially parallel to the sector along which the said control pointer is shifted by the said scale beam, a transverse bar extending transversely along the said oscillation sector of the said pointer on the side opposite to said levers, and rockable towards and away from said pointer, so as to shift said pointer against one of said lever which corresponds in position to said pointer and rock said one lever through a predetermined angle, and retract said pointer therefrom after the said pointer has abutted against said one lever, means connected to said lever for transforming the rocking movement thereof effected by the abutting of said control pointer into a limited linear stroke of the corresponding weight range indicating pen in one direction, said chart extending in the direction of movement of all pens, so that the pens bearing thereon trace a stroke each time they are driven by the corresponding lever, spring means being provided for urging said levers in a position of rest when they are not acted upon by said pointer and means for retracting said control pointer from said levers each time the said transverse bar is retracted from said control pointer, and in which each pen is slidably mounted between parallel guides and is connected to a flexible transmission means tensioned between at least two pulleys one of which is operatively connected with a stepwise driving means comprising a ratchet wheel and a driving pawl whereby the driving pawls are each operatively connected with one of said rocking levers, said pen-carrying flexible members being provided with an abutment member co-acting, at the end of its run, with a switch control mechanism which stops the machine.

14. An apparatus according to claim 2, in which the weigher pan is formed like a skip provided with a hinged bottom, means for keeping said bottom in a closed position during the charging and the weighing of the cigarette batch therein, for opening said automatically after each weighing operation, so as to discharge the cigarettes and for closing it again after the cigarette batch has been discharged.

15. An apparatus according to claim 2, in which the weigher pan is formed like a skip provided with a hinged bottom, means for keeping said bottom in closed position during the charging and the weighing of the cigarette batch therein, means for opening said bottom automatically after each weighing operation, so as to discharge the cigarettes and for closing it again after the cigarette batch has been discharged, and means which operate in synchronism with the device for abstracting cigarette samples from a deflecting and conveying device, and which act on a part of the skip-like weigher pan so as to keep said pan in a fixed position during the charging of the cigarette samples, to allow said pan to freely oscillate during the weighing operations and to keep again said pan in fixed position each time the pan bottom is opened for discharging the cigarettes.

16. An apparatus according to claim 2, in which the weigher pan is formed like a skip provided with a hinged bottom, means for keeping said bottom in closed position during the charging and the weighing of the cigarette batch therein, means for opening same automatically after each weighing operation, so as to discharge the cigarettes and for closing it again after the cigarette batch has been discharged, said means for opening the bottom of the skip-like pan comprising a vertical push rod and a cam for reciprocating said push rod in synchronism with the remaining parts of the apparatus.

17. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle wherein the chart is supported by a frame slidably mounted transversely with respect to the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, upon each rocking movement of the lever the chart supporting frame will be shifted correspondingly; and in which the stepwise shifting of the weight range indicator pens is effected by a mechanism comprising an independent control lever for each weight range indicator pan, said levers being idly fulcrumed substantially parallel to the sector along which the said control pointer is shifted by the said scale beam, a transverse bar extending transversely of said oscillation sector of the said pointer, on the side opposite to said levers, and rockable towards and away from said pointer, so as to shift said pointer against one of said levers corresponding in an angular position to said pointer and to rock said one lever through a predetermined angle, and to retract same therefrom after the said pointer has abutted against said one lever, means connected to said lever for transforming the rocking movement thereof effected by the abutting of said control pointer into a limited linear stroke of the corresponding weight range indicator pen in one direction, said chart extending in the direction of movement of all pens, so that the pens bearing thereon trace a stroke each time they are driven by the corresponding lever, spring means being provided for urging said levers in a position of rest when they are not acted upon by said pointer and means for retracting said control pointer from said levers each time the said transverse bar is retracted from said control pointer, and in which all the range indicating-control levers, each time they drive their respective pens, act at the same time on a general weighing counter which indicates the total number of weighings effected in the apparatus during the recording of the weight range indications by each of the weight range indicating pens on the same chart.

18. An apparatus according to claim 2 in which the indicating and recording means comprises a recording chart-carrying frame, a number of writing pens movably supported adjacent said chart to move toward and away from said chart and record different weight ranges thereon, means for stepwise shifting said pens in parallel relation with their points in contact with said recording chart and each of which is actuated to draw a vertical stroke in response to a weighing cycle wherein the chart is supported by a frame slidably mounted transversely of the movement of the pens, means for shifting said frame after a predetermined number of weighing operations alternately in opposite directions so that the lines traced by the pens assume the shape of a fret line, said last-named shifting means comprising a lever connected to said chart-supporting frame and means for rocking said lever at intervals which correspond to a predetermined number of weighing operations, wherein upon each rocking of the lever the chart supporting frame will be shifted transversely correspondingly; and in which the stepwise shifting of the weight range indicating pens is effected by a mechanism comprising an independent control lever for each weight range indicator pan, said levers being idly fulcrumed substantially parallel to the sector along which the said control pointer is shifted by the said scale beam, a transverse bar extending transversely along the said oscillation sector of the said pointer, on the side opposite to said levers, and rockable towards and away from said pointer, so as to shift said pointer against one of said levers corresponding in position to the angular position of said pointer and rock said one lever through a predetermined angle, and to retract same therefrom after the said pointer has abutted against said one lever, means connected to said lever for transforming the rocking movement thereof effected by the abutting of said control pointer into a limited linear stroke of the corresponding weight range indicating pen in one direction, said chart extending in the direction of movement of all pens, so that the pens bearing thereon trace a stroke each time they are driven by the corresponding lever, spring means being provided for urging said levers to a position of rest when they are not acted upon by said pointer and means for retracting said control pointer from said levers each time the said transverse bar is retracted from said control pointer, and in which all the weight range indicator-control levers, each time they drive their respective pens, act on the same time on a general weighings counter which indicates the total number of weighings effected in the apparatus during the recording of the number of weighing cycles by each of the weight range indicating pen on the same chart, whereby said general weighings counter is operated by a mechanism which is identical to that of the range weighing indicator with the exception that its rocking lever is under the control of a transversal rod which is rocked each time one of the range weighing indicator control levers is operated by the said control pointer.

19. An apparatus according to claim 2 in which the indicating and recording means comprises a recording chart-carrying frame, a number of writing pens presented to the chart to mark weight range indications thereon, means for stepwise shifting said pens in parallel relation with their points in contact with said recording chart and each of which is actuated to draw a vertical stroke in response to a weighing cycle which indicates a weight falling within the range corresponding to it wherein the said chart-carrying frame is mounted on a shaft having eccentric portions, and means for rotating said shaft and shifting said frame-supported chart into and out of contact with the writing means.

20. An apparatus according to claim 2, said apparatus being enclosed in a casing having a door which is connected to locking means which are operatively connected to the recording devices, whereby upon unlocking of said means said recording devices are disengaged from driving means and permit the manual shifting into starting position of all recording means.

21. An apparatus for automatically weighing and recording the weights of cigarette batches formed by a plurality of cigarette samples periodically removed from a cigarette making machine, comprising a beam scale, a pan attached to the beam scale for receiving cigarettes removed from the production line of said cigarette machine, means for holding said scale against movement while cigarettes are being charged thereinto, means for discharging cigarettes from said pan after each weighing operation, a recording chart adjacent the beam of said scale having a chart thereon, a plurality of stylus pens mounted for vertical sliding movement in said frame with each of said stylus pens corresponding to a preselected weight range and their stylus points continuously in contact with said recording chart, a lever arm pivoted to the beam of the scale to rock about an axis extending transverse to the fulcrum axis of said beam, a plurality of lever arm engaging levers, means for moving said lever arm into a preselected lever arm engaging lever and means operable by said lever arm engaging levers to move said stylus pens stepwise and draw a vertical stroke on said chart in response to each weighing operation which indicates a weight falling within the weight range corresponding to it, said stylus pens being moved in a stepwise direction for a predetermined distance with respect to said chart whereby the stylus pen which corresponds to the particular weighing range of one of the batches of cigarettes will be moved to mark an indication thereof on said record chart.

22. An apparatus for automatically weighing and recording the weights of batches of cigarettes formed by a plurality of cigarette samples periodically removed from a cigarette making machine, comprising a beam scale, a pan attached to the beam scale for receiving cigarettes from said cigarette making machine, means for holding said scale pan against movement during each weighing cycle and while cigarettes are being charged thereinto, means for discharging cigarettes from said pan after each weighing operation, a recording chart adjacent the beam of said scale having a chart thereon, a plurality of stylus pens mounted for vertical sliding movement with their points in continuous contact with said chart, each of said stylus pens being arranged to correspond to a preselected weight range falling within the range which will mark and draw a vertical stroke on the chart in response to a weighing cycle, a lever arm pivoted to the beam of the scale to rock about an axis normal to the fulcrum axis of the scale beam, a plurality of lever arm engaging members, means for moving said lever arm into engagement with a preselected lever arm engaging member, means operably connected to each of said lever arm engaging members and to a corresponding stylus pen to advance the stylus pens a step in a vertical direction and record a mark on said chart within one of the preselected weight ranges, and means for shifting said recording chart frame horizontally after each recording movement of said stylus pens.

23. An apparatus for automatically weighing and recording the weights of cigarette batches formed by a plurality of cigarette samples removed periodically from a cigarette making machine, comprising a beam scale, a pan attached to the beam scale, for receiving cigarettes, means for holding said scale against movement while the cigarettes are being charged thereinto, means for discharging cigarettes from said pan after each weighing cycle, a recording chart frame mounted adjacent the scale having a chart thereon, a plurality of stylus pens mounted for vertical movement with their ends in engagement with said chart and each pen corresponding to a preselected weight range, a lever arm pivoted to the beam of the scale to rock about an axis normal to the fulcrum axis of said beam, a plurality of ratchet levers, means for moving said lever arm into engagement with one of said ratchet levers depending upon the weight range of the batch of cigarettes being weighed, and flexible endless belt means connected to said stylus members adapted to be moved in a step-like manner when said lever arm is moved into engagement with one of said members to mark a stroke on said chart in response to a weighing cycle indicator weight falling within the range corresponding to it, and means for moving said chart frame intermittently to and fro in a direction at right angles to the direction of movement of said stylus pens.

24. An apparatus for automatically weighing and recording the weights of cigarette batches formed by a plurality of cigarettes samples periodically removed from a cigarette making machine, comprising a beam scale, a pan suspended from the beam of said scale for receiving cigarettes from said cigarette machine, means for holding said scale and pan against movement while cigarettes are being charged therein, means for discharging cigarettes from said pan after each weighing operation, a recording chart frame mounted adjacent said scale having a chart thereon, a plurality of stylus pens mounted for vertical sliding movement with their ends presented to said chart, there being a number of pens equal to a number of different weight ranges, a lever arm pivoted to said scale beam to rock on an axis normal to the fulcrum axis of said beam, a plurality of pen actuating members arranged one for each stylus pen, ratchet mechanism connecting each actuating member to its corresponding stylus pen, means engageable with said lever arm to move the same into engagement with one of said stylus pen actuating members so that the stylus pen connected therewith will mark a vertical stroke on the chart and indicate a weight falling within the range corresponding to it and a corresponding batch of cigarettes during a weighing cycle, means for intermittently shifting said chart carrying frame in a direction transverse to the movement of said stylus pens, and an additional stylus pen engaging said chart and adapted to be actuated by another pen actuating member engageable by additional actuating means influenced by said lever arm to mark another stroke on said chart and provide an indication of the total number of weighing cycles.

References Cited in the file of this patent

UNITED STATES PATENTS

| | | |
|---|---|---|
| 1,823,281 | Molins | Sept. 15, 1931 |
| 1,851,703 | Hamilton | Mar. 29, 1932 |
| 1,996,189 | Biro | Apr. 2, 1935 |
| 2,121,191 | Tahir | June 21, 1938 |
| 2,167,517 | Korber | July 25, 1939 |
| 2,329,975 | Best | Sept. 21, 1943 |
| 2,601,786 | Best | July 1, 1952 |
| 2,623,741 | Broekhuysen | Dec. 30, 1952 |
| 2,707,630 | Molins | May 3, 1955 |
| 2,745,411 | Gilman et al. | May 15, 1956 |